(12) United States Patent
Fitzgerald et al.

(10) Patent No.: US 9,300,540 B2
(45) Date of Patent: Mar. 29, 2016

(54) MULTICAST NETWORK DIAGNOSTICS

(75) Inventors: Deborah E. Fitzgerald, Acton, MA (US); Srikanth Keesara, Tewksbury, MA (US)

(73) Assignee: AVAYA INC., Basking Ridge, NJ (US)

( * ) Notice: Subject to any disclaimer, the term of this patent is extended or adjusted under 35 U.S.C. 154(b) by 1189 days.

(21) Appl. No.: 13/271,421

(22) Filed: Oct. 12, 2011

(65) Prior Publication Data

US 2012/0113817 A1  May 10, 2012

Related U.S. Application Data

(63) Continuation-in-part of application No. 12/942,282, filed on Nov. 9, 2010, now Pat. No. 8,750,299.

(51) Int. Cl.
| | |
|---|---|
| H04L 12/28 | (2006.01) |
| H04L 12/56 | (2006.01) |
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/24 | (2006.01) |

(52) U.S. Cl.
CPC ............... *H04L 41/12* (2013.01); *H04L 43/10* (2013.01)

(58) Field of Classification Search
CPC .............................. H01L 43/10; H01L 41/12
USPC .................................................. 370/248, 390
See application file for complete search history.

(56) References Cited

U.S. PATENT DOCUMENTS

| 2007/0165657 | A1* | 7/2007 | Smith et al. | 370/401 |
| 2009/0232006 | A1* | 9/2009 | Mohan et al. | 370/241.1 |
| 2012/0106339 | A1* | 5/2012 | Mishra et al. | 370/235 |

* cited by examiner

*Primary Examiner* — Derrick Ferris
*Assistant Examiner* — Farhad Ali
(74) *Attorney, Agent, or Firm* — Anderson Gorecki & Rouille LLP

(57) ABSTRACT

A Shortest Path Bridging (SPB) network provides a multicast traceroute using network identifiers such as IP addresses for the source and destination (multicast group). The network identifiers, which are based on layer 3 (IP) designations of the traced multicast group, are mapped to a network identifier of the multicast group (corresponding to a layer 2, or MAC address) and an associated Virtual Local Area Network (VLAN) which is used to transport the packets belonging to the multicast flow. Therefore, an operator issuing the traceroute command need not be familiar with the layer 2 concepts of the network, but rather need only supply the layer 3 (IP address) designations of the concerned entities.

17 Claims, 6 Drawing Sheets

MULTICAST NETWORK DIAGNOSTICS

RELATED APPLICATIONS

This application is a continuation-in-part (CIP) of U.S. patent application Ser. No. 12/942,282, filed Nov. 9, 2010, entitled "MULTICAST TREE DISCOVERY USING 802.1ag," incorporated herein by reference in entirety.

BACKGROUND

Modern computer networks strive for transparency of the physical network. Various utilities and applications are available for providing a user with a similar login experience regardless of location, enabling trends such as telecommuting and virtual private networks (VPNs). In a Virtual Local Area Network (VLAN), for example, users in distinct physical networks employ transport services that appear to be part of the same LAN. The IEEE 802.1aq standard of Shortest Path Bridging (SPB) networks extends the well entrenched Ethernet approach for accommodating virtual LANs and wireless transport ("IEEE" is known in the art to refer to "Institute of Electrical and Electronics Engineers"). Multiple paths coexist such that a shortest path with minimal latency is automatically created and if there is a failure of a link or switch, the failover time is minimal. SPB also removes the complexity of manual VLAN extensions and avoids the somewhat cumbersome spanning tree protocol.

SUMMARY

In an SPB network, VLAN implementation is facilitated by identifying multiple redundant paths and employing an optimal, or shortest, path between network entities. The same transparency that enhances the user experience in an SPB network can also tend to obscure or hide diagnostic issues such as dropped or slow connections. Diagnostic tools are often employed to pinpoint problems with the physical network, which the transparency of the network attempts to abstract. In particular, linktrace operations, often employed to identify an inoperative segment between switching or routing nodes, are complicated by multicast groups, which associate multiple recipients with a single destination address.

Linktrace operations, often implemented as a so-called "traceroute" command, request an acknowledgement message from each network hop so that the omitted or incomplete acknowledgement identifies the point of failure. Such commands identify concerned network entities via network addresses. Configurations herein are based, in part, on the observation that computer networks, such as an SPB network, frequently identify networking devices such as routers and bridges using a hardcoded identifier of the hardware, such as a MAC address, rather than a dynamic (network assigned) identifier such as an IP address. IP addresses are often assigned by a system administrator, and therefore tend to follow a systematic or hierarchical arrangement known to the system administrator. MAC addresses are fixed to the hardware device, and cannot be reconfigured to correspond to system topology or usage. Accordingly, MAC addresses can be somewhat unwieldy and often require a manual lookup by an operator for issuing a command with respect to a MAC address.

Unfortunately, conventional approaches to traceroute management suffer from the shortcoming that traceroute commands (linktrace operations) employ a hardware identifier, or MAC address, rather than an administratively assigned network identifier such as an IP address, to denote the entities for a multicast traceroute command. IP addresses are often known to an operator issuing such a command, in contrast to layer 2 MAC addresses which are fixed and often appear cryptic and arbitrary, since they are not assigned based on any established hierarchy, geography or topology.

Accordingly, configurations herein substantially overcome the shortcomings of MAC based traceroute approaches by providing a multicast traceroute using network identifiers such as IP addresses for the source and destination (multicast group). The network identifiers, which are based on layer 3 (IP) designations of the traced multicast group, are mapped to a network identifier of the multicast group (corresponding to a layer 2, or MAC address) using an associated VLAN in which the multicast members are based. Therefore, an operator or user issuing the traceroute command need not be familiar with the layer 2 concepts of the network, but rather need only supply the layer 3 (IP address) designations of the concerned entities. Traceroute command processing, discussed further below, maps the media flow source and multicast group IP designations (IP addresses) to a VLAN including the multicast group and a multicast MAC identifier based on a service instance ID (I-SID) and a mnemonic name (nickname) indicative of a SPB Network device. The multicast MAC identifier, as with its IP counterpart multicast group address, does not refer to a specific device but rather collectively represents the multicast group as a MAC address form for allowing link trace request (LTM) and link trace response (LTR) messages.

In further detail, configurations herein perform a network trace in an SPB (shortest path bridging) network by identifying a multicast flow corresponding to a stream of receivable media for rendering on a user device, and determine, from the identified multicast flow, a source and a group, in which the source defines a device sending the stream and the group defines a multicast address indicative of a plurality of users receiving the stream of receivable media, such as a video or audio stream. The command processing determines a virtualization instance identifying an administrative organizational grouping of the SPB network, such as a department or location, and identifies, from the virtualization instance, a virtual LAN inclusive of the multicast group. The traceroute command maps the source and group to a database having a mapping of layer 2 addresses to layer 3 addresses of network entities, and receives, from the mapping, a mnemonic name corresponding to a SPB Network device and a service identifier corresponding to the stream delivered to the multicast address. The traceroute aggregates the received mnemonic name and service identifier into a layer 2 identifier, such as a MAC address command format, indicative of layer 2 paths taken by the stream. The network performs, based on the virtual LAN and the layer 2 identifier, a multicast traceroute for generating a rendering of network entities of the multicast group.

In an example configuration, employing the above referenced 802.1ag standards in an SPB network, a traceroute operation may proceed as follows:

A user initiates a request by identifying a flow to trace.

The flow is identified by an IP Source Address and IP Group Address, of either an Ipv4 or Ipv6 network arrangement.

This (Source, Group) is mapped to a (VLAN, MAC_DA) that is used to carry the stream in the SPB Network.

An 802.1ag LTM message is constructed and sent. This message has a VLAN field and a target MAC address field.

The VLAN is set to be the VLAN obtained from the mapping above.

The target MAC address is set to the MAC_DA obtained from the mapping above.

It should be noted that the above approach need not occur within an SPB network, however, in such an SPB Network, particular configurations are operable for The VLAN being a BVLAN (Backbone VLAN) in the SPB Network and MAC_DA being a multicast BMAC address made up of a 24-bit I-SID, a 20-bit nickname and 4 auxiliary bits.

Alternate configurations of the invention include a multi-programming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Depicted below is an example configuration of a multicast networking environment suitable for use with configurations disclosed herein. Multicast processing and diagnostics are burdened because a network destination identifies multiple recipients, in contrast to conventional point-to-point routing and switching. Accordingly, diagnostic commands such as linktrace as well as normal service traffic flag the multicast addresses and perform alternate processing, since the network traversal tends to fan out to parallel paths to multiple destinations. In recent years, IEEE-802.1ag has been developed as an IEEE standard that defines troubleshooting procedures for Ethernet based layer-2 networks. Diagnostic commands include Linktrace, which is a protocol defined by IEEE-802.1ag to discover the unicast path between two points (or two MAC addresses) in an Ethernet based network, and Loopback, a protocol defined by IEEE-802.1ag to verify the unicast connectivity between two points (or two MAC addresses) in an Ethernet based network.

Figure 1:
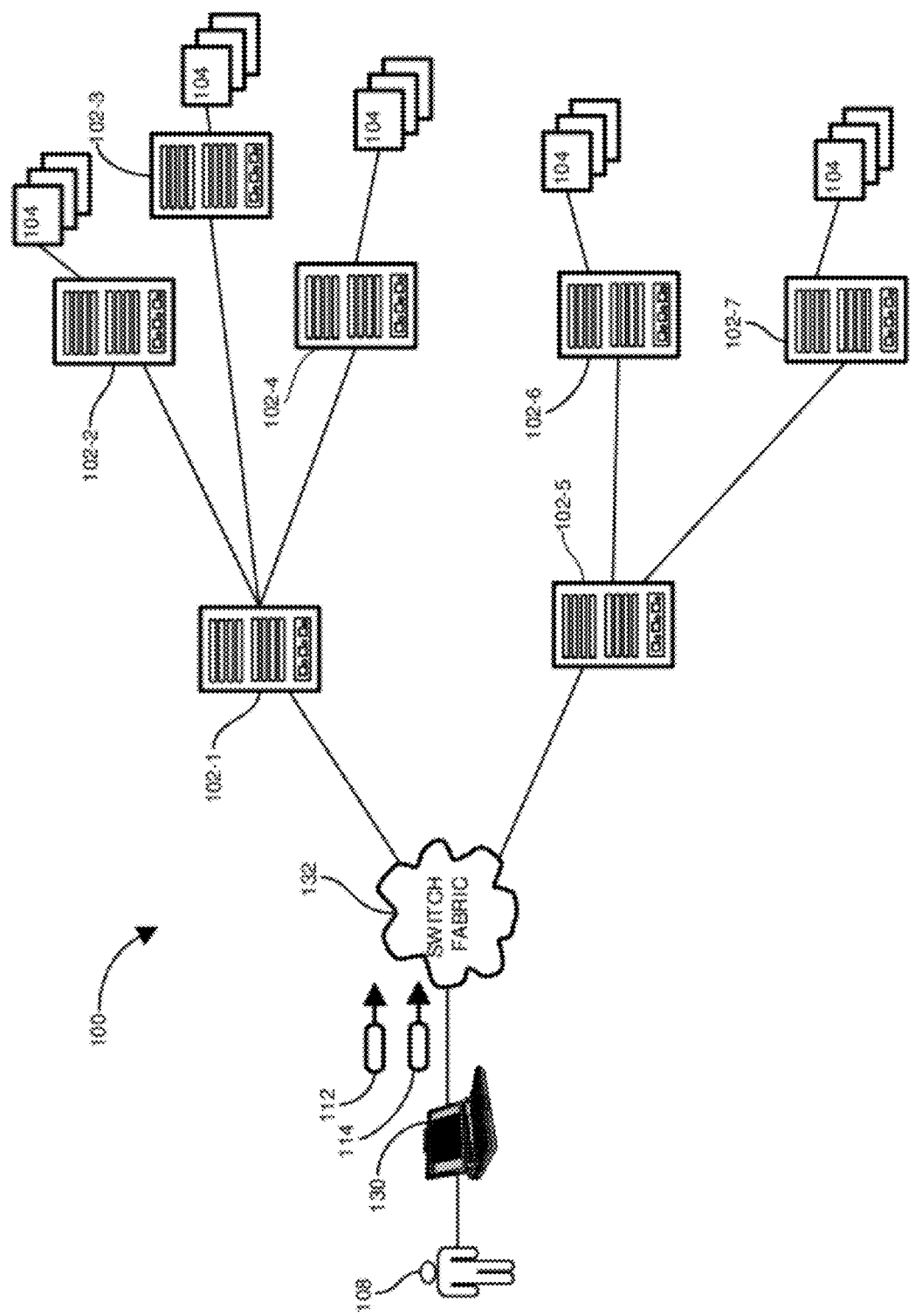
FIG. 1 is a context diagram of a SPB (Shortest Path Bridging) network suitable for use with configurations disclosed herein.

FIG. 1 is a context diagram of a SPB (Shortest Path Bridging) network 100 suitable for use with configurations disclosed herein. Referring to FIG. 1, an SPB network includes a plurality of control nodes 102-1 ... 102-7 (102 generally), such as routers and switches, for transporting message traffic to user nodes 104, which are generally a terminus or endpoint of a message path to a recipient. As indicated above, multicast transmissions emanate from a multicast source and have multiple destinations, addressed by a multicast group address that is different than individual recipient addresses. Multicast traversal, therefore, typically follows a fanning out from the source node, as multiple paths may be taken from a control node on paths leading to different members of the multicast group, in contrast to unicast messages which are transported on only one path. In general, at the control nodes 102, for any path from the control node 102 leading to a multicast recipient (member of the multicast group), the message is transported on that path. Only if no multicast recipients are reached by a path would the multicast message not be transported.

Diagnostics of transport anomalies to multicast groups are therefore more complex to diagnose due to the fanning out of potential paths. Accordingly, a multicast traceroute implements a linktrace (LTM) message on each path of a multicast group, and therefore receives a corresponding LTR from each of the control nodes along the path. An operator 108 typically issues a multicast traceroute from an operator console 130, and specifies the source and multicast group (target) of the multicast traceroute. The network 100 receives the message via a switch fabric 132 defining the network 100 that includes the multicast source address 112 and multicast group address 114. In configurations discussed further below, the multicast source 112 and multicast group 114 are identified by a network identifier, such as an IP address, which is typically more mnemonic and recognizable by the operator 108 than a hardware identifier such as a MAC address. The above reference U.S. Patent Application applies these concepts to a multicast arrangement. The present configurations extend a multicast traceroute to network identifiers such as IP addresses.

One issue with conventional traceroute diagnostics is whether the trace is responsive to layer 2 (L2 MAC address) forwarding or layer 3 (L3, IP Address) routing. Switches typically forward message packets based on the L2 MAC address, while routers employ the L3 IP address. Hence, tracing operations based on L3 routes eludes intermediate switches.

Figure 2:
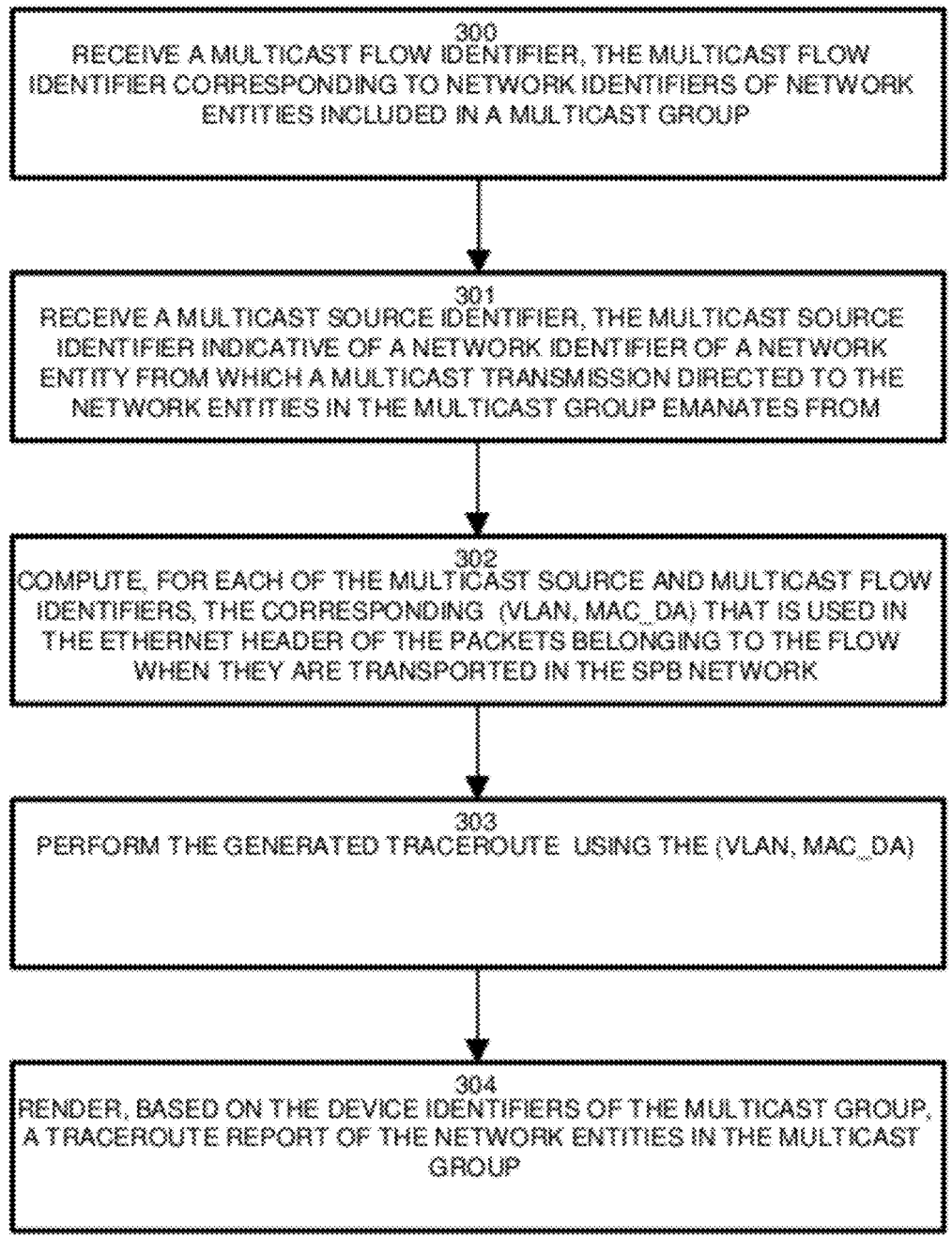
FIG. 2 is a flowchart of traceroute processing in the environment of FIG. 1.

FIG. 2 is a flowchart of traceroute processing in the environment of FIG. 1. Referring to FIGS. 1 and 2, in a network environment having network entities with assigned network identifiers and static device identifiers, the method of rendering diagnostic information as disclosed herein includes, at step 300, receiving, via an operator console 130 for issuing diagnostic commands, a multicast flow identifier 112, such that the multicast flow identifier corresponds to network identifiers such as IP addresses of network entities included in a multicast group. In the example arrangement, the traceroute occurs on an SPB network according to an 802.1ag sequence. Thus, the user 108 initiates a request by identifying a flow to trace. The operator console 130 also receives a multicast source identifier 114, in which the multicast source identifier is indicative of a network identifier of a network entity from which a multicast transmission directed to the network entities in the multicast group emanates from, as depicted at step 301. The flow is therefore identified by an IP Source Address and IP Group Address, which could be either an IPv4 or IPv6 address. In alternate arrangements, any suitable addressing scheme other than IP may also be employed. The operator console 130 computes, for each of the multicast source and multicast flow identifiers, the corresponding trace identifier for generating a traceroute depicting interconnections of the network entities included in the multicast group. In the example arrangement, the trace identifiers are MAC address counterparts to the IP addresses for multicast source and target (destination group), which occupy MAC address fields in a linktrace command format according to the predetermined standard cited above. This (Source, Group) pairing is mapped to a (VLAN, MAC_DA) that is used to carry the stream in the SPB Network. In an SPB network, therefore, this includes the corresponding VLAN and MAC_DA that is used in the Ethernet header of the packets belonging to the flow during transport in an SPB network, as depicted at step 302.

The operator console 130 performs the generated traceroute using the trace identifier by propagating the traceroute command over the network. An 802.1ag LTM message is constructed and sent. This message has a VLAN field and a target MAC address field. The VLAN is set to be the VLAN obtained from the mapping above, and the target MAC address is set to the MAC_DA obtained from the mapping above. In the example SPB network, the console 130 issues commands to perform the generated traceroute using the (VLAN, MAC_DA), as depicted at step 303, and renders, based on the device identifiers of the multicast group, a traceroute report of the network entities 104 in the multicast group, as shown at step 304. Since the traceroute processing includes traversing the network to evoke an LTR message from each concerned node, processing logic as defined herein may occur with respect to each node receiving the LTM message and responding with an LTR message. The operator console 130 from which the command emanates assembles the traceroute command as defined herein, and network nodes 102 are responsive to the command as it propagates over the network.

Figure 3:
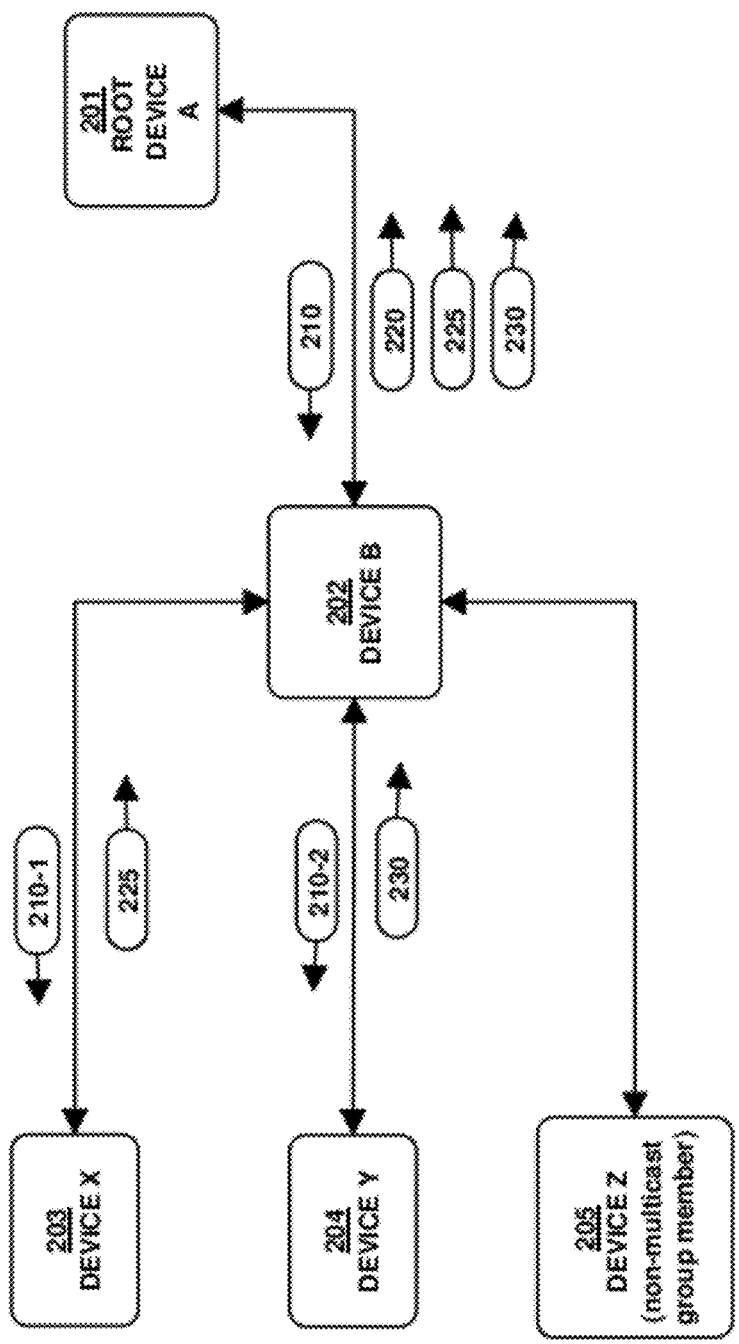
FIG. 3 is a diagram of device based traceroute processing.

FIG. 3 is a diagram of device based traceroute processing using a plurality of network devices 201, 202, 203, 204, 205. Referring to FIG. 3, a root device A 201, device X 203 and device Y 204 are members of a multicast group, while device Z 205 is not a member of the multicast group. Device B 202 receives a data packet 210 (such as an IEEE 802.1ag request data packet or a linktrace message: "LTM") from root device A 201. The data packet provides a multicast target MAC address. Device B determines that root Device A 201, Device X 203 and Device Y 204 each belong to a given multicast group—while device Z 205 does not.

Device B 202 forwards an instance of the data packet 210-1, 210-2 to Device X 203 and device Y 204, respectively. In addition, device B 202 generates and transmits a response (such as an IEEE 802.1ag reply data packet or "LTR") back to root device A 201. The response sent from device B 202 indicates device B's placement with respect to a hierarchical tree of network devices 201, 203, 204 belonging to the multicast group. As illustrated in FIG. 2, it is noted that device B 202 is a transit device and not a multicast group member. However, in other embodiments, device B 202 could employ similar tree tracer processing as a multicast group member.

Both device X 203 and device Y 204 each respectively receive a data packet instance 210-1, 210-2. In response to receipt of a data packet instance 210-1, 210-2, device X 203 and device Y 204 each individually generate and transmit a response 225, 230 (such as an Linktrace Response: "LTR") through device B 202 and back to Root device A 201. The response 225 sent from device X 203 indicates device X's placement with respect to the hierarchical tree of network devices 201, 203, 204 belonging to the multicast group. The response 230 sent from device Y 204 indicates device Y's 204 placement with respect to the hierarchical tree of network devices 201, 203, 204 belonging to the multicast group. Root device A 201 receives all the responses 220, 225, 230 and can construct a graphical representation of all the paths between Root device A 201, device B 202, device X 203 and Device Y 204.

While FIG. 2 illustrates three responders (device B 202, device X 203 and device Y 204), other embodiments are not limited to only three responders. Rather, Forwarding LTMs and generating LTRs can be performed by any number of network devices depending on however wide and deep the hierarchical tree of network devices for a particular multicast group. It would be beneficial to issue the traceroute command using network identifiers such as IP addressees to denote the root device 201 and the multicast group, rather than MAC addresses which may not be as readily known or available to the operator 108 issuing the command.

Figure 4:
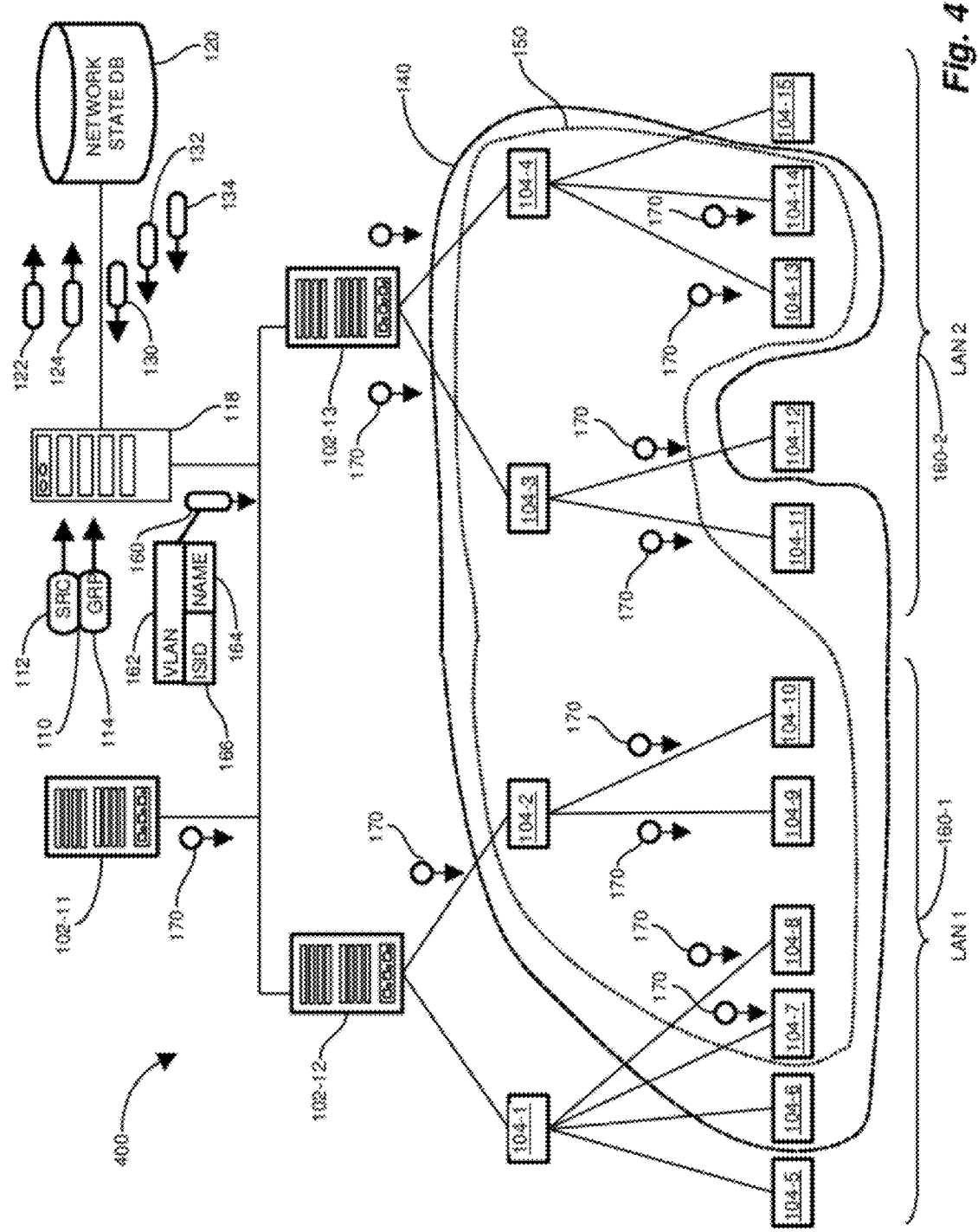
FIG. 4 is a diagram of multicast traceroute processing using network identifiers as disclosed herein.

FIG. 4 is a diagram of multicast traceroute processing using network identifiers as disclosed herein. Referring to FIGS. 1, 3 and 4, an administration of the L2 traceroute command in an example SPB network is shown. The network 400 includes control nodes 102-11 . . . 102-13 and user, or recipient nodes 104-1 . . . 104-15. A VLAN 140 spans physical LANs 180-1 and 180-2, and a multicast group 150 includes members of the VLAN 104-2, 3, 4, 7, 8, 9, 10, 13 and 14. A multicast flow, shown as example packets 170, is delivered to the multicast group 150 members.

The operator 108 enters a traceroute command 110 including a multicast source address IP address 112 and a multicast group IP address 114. A management console 118 receives the command 110, and queries a network state DB 120 using the network identifiers corresponding to the multicast source 122 and group 124 (IP addresses, in the example shown). In response, the DB 120 returns a VLAN 130, an ISID 132, and a mnemonic name 134 (nickname) of an SPB Network device. The ISID is a service identifier that identifies an instance of the multicast service, and is a dynamic identifier in the case of multicast transport services (Unicast ISIDs, in contrast, are static). The VLAN 130 corresponds to the recipient members of the multicast group 150. The ISID 132 along with the VLAN indicates the multicast group members. The mnemonic name 134 corresponds to a SPB Network device. The console 118 generates a multicast link trace command 160 by replacing the MAC fields with the computed multicast VLAN 130, ISID 132 and nickname 134. The VLAN ID field 162 is replaced with the VLAN 130, and the target MAC field is replaced with the ISID 132 and the nickname 134.

Figure 5:
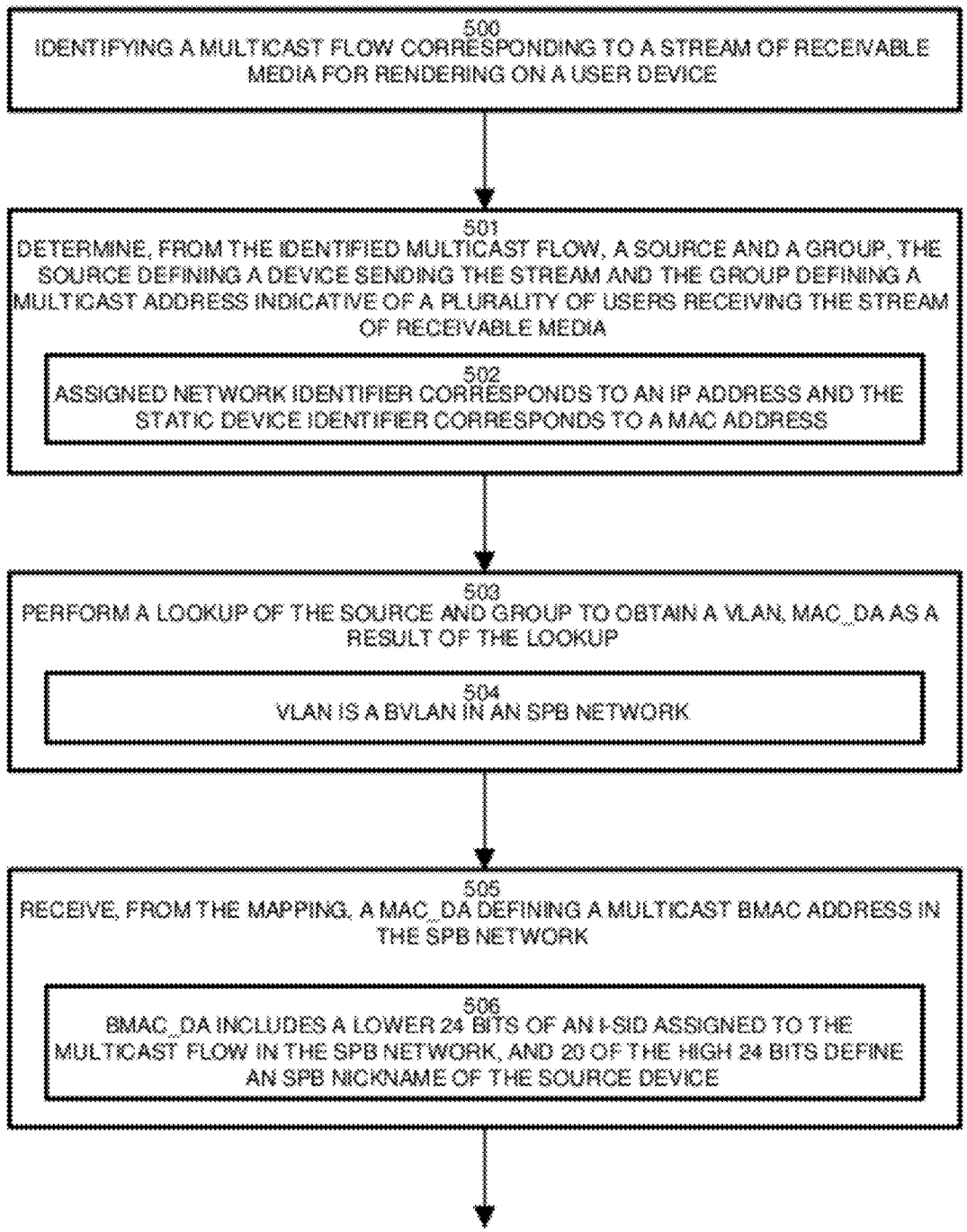
FIGS. 5-6 are a flowchart of traceroute processing in the network of FIG. 4.
Figure 6:
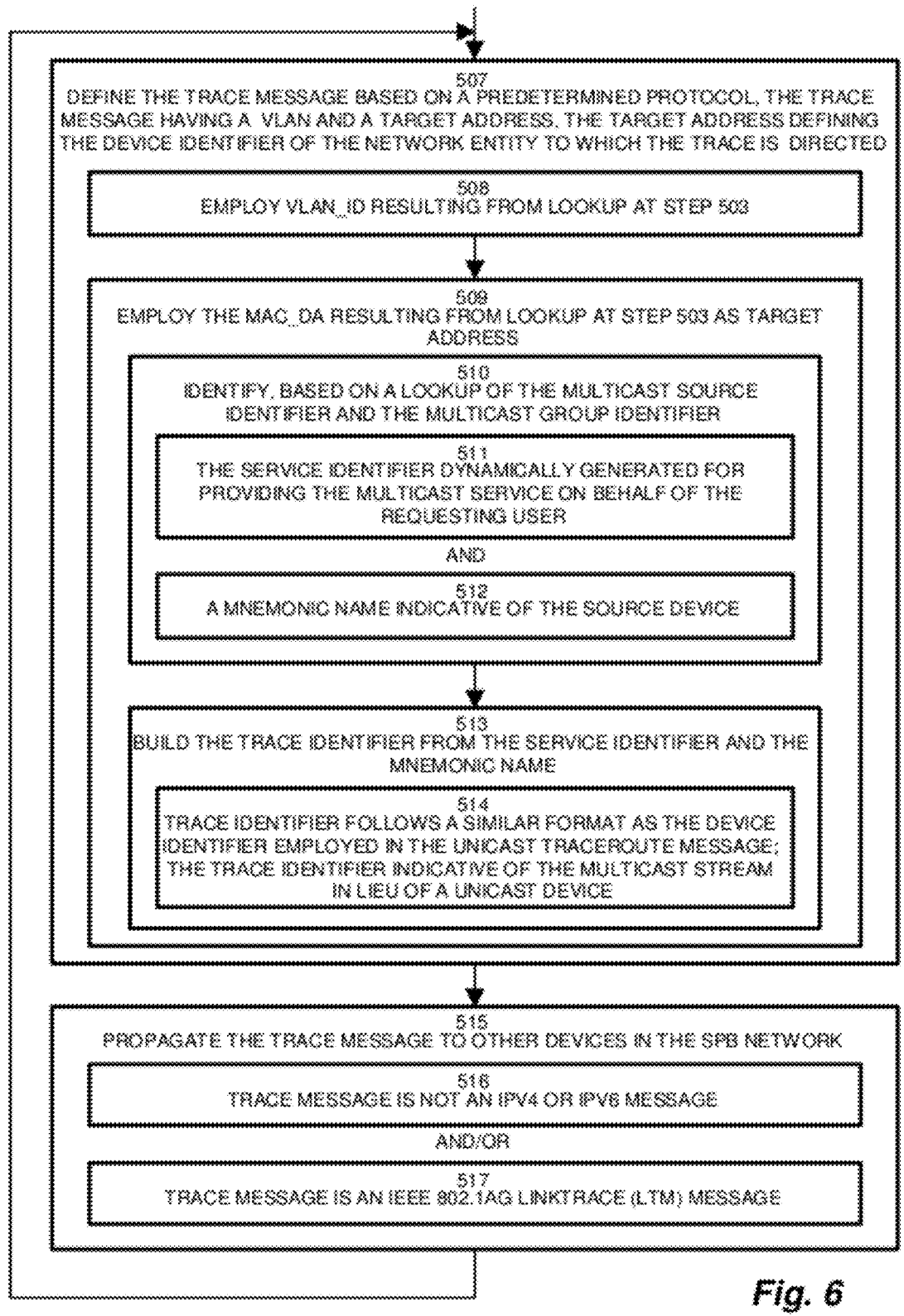

FIGS. 5-6 are a flowchart of traceroute processing in the network of FIG. 4. Referring to FIGS. 4-7, at step 500, a particular configuration of the disclosed method of performing a network trace in an SPB network includes identifying a multicast flow corresponding to a stream 170 of receivable media for rendering on a user device 104. The multicast flow has a network identifier (IP address) corresponding to each of the devices of the multicast group, in addition to the IP address of each individual user device 104. The management console 118 determines, from the identified multicast flow, the source 122 and the 124 group, such that the source defines a device 102 sending the stream 170 and the group defines a multicast address indicative of a plurality of users 104 receiving the stream of receivable media, as depicted at step 501. The assigned network identifier for source and group corresponds to an IP address as disclosed at step 502, while a static device identifier as discussed below corresponds to a MAC address.

The console 118 maps the source 122 and group 124 to the database having a mapping of layer 2 addresses to layer 3 addresses of network entities to obtain the MAC address forms of the multicast parameters. In the example arrangement, this includes performing a lookup of the Source and Group to obtain a (VLAN, MAC_DA) as the result of the lookup, as depicted at step 503. For the traceroute command 160, the layer 2 identifier occupies a MAC address field in a link trace management packet while the corresponding source 112 and group 114 correspond to IP addresses. In the example arrangement, the management console 118 identifies a virtualization instance that denotes an administrative organizational grouping of the SPB network. The management console 118 identifies, from the virtualization instance, a virtual LAN 130 inclusive of the multicast group 150. This involves performing a lookup of a virtual LAN identifier based on the multicast group 150 members dispersed over an SPB network. In the example SPB network, the VLAN is a BVLAN in the SPB Network, as is known in the art, as shown at step 504.

The management console 118 receives, from the mapping, a mnemonic name 134 corresponding to a SPB Network device and a service identifier (ISID) 132 corresponding to the stream 170 delivered to the multicast address 114, as depicted at step 505. In the example arrangement, the service identifier, or ISID 132 corresponds to a multicast flow 170 and a device identifier (MAC address) corresponds to the multicast source 102-11 of the media stream carried by the multicast flow 170, as clarified at step 506. The management console 118 defines the trace message 160 (traceroute command) based on a predetermined protocol, such that the trace message 160 has a VLAN and a target address field defining the device identifier of the network entity to which the trace is directed, which in this case is the multicast group 150, as shown at step 507. The management console 118 aggregates the received mnemonic name 134 and service identifier 132 into a layer 2 identifier 164, 166 indicative of layer 2 paths taken by the stream 170. In the example SPB configuration, this includes the VLAN_ID resulting from the lookup at step 503, as depicted at step 508. The management console 118 replaces the target address with the trace identifier 164, 166 indicating the multicast network target for which a trace is sought. This includes, in an SPB network, employing the MAC_DA resulting from the lookup at step 503 as the target address, as shown at step 509.

Generating the corresponding trace identifier 164, 166 further includes, at step 510, identifying, based on a lookup of the multicast source identifier 112 and the multicast group identifier 114 (from step 503), a service identifier, such that the service identifier is dynamically generated for providing the multicast service on behalf of the requesting user, as depicted at step 511, and a mnemonic name indicative of an SPB Network device, as clarified at step 512. The management console 118 then builds the trace identifier from the service identifier 166 and the mnemonic name 164, as depicted at step 513. In the example arrangement, the trace identifier 164, 166 follows a similar format as the device identifier employed in the unicast traceroute message; in which the trace identifier is indicative of the multicast stream 170 in lieu of a unicast device, as disclosed at step 514. The traceroute message (trace message) is then propagated to other devices in the SPB network for traceroute operation, as defined in the above referenced copending application, as depicted at step 515. In alternate configurations, the message may be a form other than an IPv4 or IPv6 message, as disclosed at step 516, and/or is conformant to IEEE 802.1ag, as depicted at step 517.

In particular configurations, once the traceroute command 160 is assembled, the management console 110 sends the command 160 for performing, based on the virtual LAN and the layer 2 identifier, a multicast traceroute for generating a rendering of network entities of the multicast group. Performing the traceroute sends trace messages from a signaling network entity (i.e. control node 102) for signaling an intermediate network entity to respond to the signaling network entity and forward the trace message to a successive network entity until the number of forwarding operations equals a time to live (TTL) field in the trace message. The traceroute command 160 is therefore recognized by the nodes 102, 104 and results in a series of messages from each of the concerned nodes. In the example arrangement, the trace message (command) 160 is a traceroute message according to IEEE 802.1ag, and the group 150 is multicast group corresponding to a layer 3 multicast address, in which the trace message is received by a connectivity management application (CFM) according to IEEE 802.1ag for mapping the network identifier to the mnemonic name.

Those skilled in the art should readily appreciate that the programs and methods for performing multicast network trace (traceroute) as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of performing multicast network trace (traceroute) has been particularly shown and described with references to embodiments thereof, it will be understood by those skilled in the art that various changes in form and details may be made therein without departing from the scope of the invention encompassed by the appended claims.

What is claimed is:

1. A method of performing a network trace in an SPB (shortest path bridging) network comprising:
   identifying a multicast flow corresponding to a stream of receivable media for rendering on a user device;

determining, from the identified multicast flow, a source and a group, the source defining a device sending the stream and the group defining a multicast address indicative of a plurality of users receiving the stream of receivable media;

mapping the source and group to a database having a mapping of layer 2 addresses to layer 3 addresses of network entities;

receiving, from the mapping, a VLAN, a mnemonic name corresponding to a SPB network device and a service identifier corresponding to the stream delivered to the multicast address wherein the service identifier occupies a MAC address field in a link trace management packet and the source and group are IP addresses;

aggregating the received mnemonic name and service identifier into a layer 2 identifier indicative of layer 2 paths taken by the stream;

performing, based on the VLAN and the layer 2 identifier, a multicast traceroute for generating a rendering of network entities of the multicast group; and wherein a MAC DA is a multicast BMAC address including a 24-bit I-SID, and a 20-bit nickname.

2. The method of claim 1 wherein receiving the mnemonic name and service identifier further comprise receiving the multicast BMAC address in the SPB network.

3. The method of claim 1 wherein the MAC_DA further includes auxiliary bits.

4. In a network environment having network entities with assigned network identifiers and static device identifiers, a method of rendering diagnostic information comprising:

receiving a multicast flow identifier, the multicast flow identifier corresponding to network identifiers of network entities included in a multicast group;

receiving a multicast source identifier, the multicast source identifier indicative of a network identifier of a network entity from which a multicast transmission directed to the network entities in the multicast group emanates from;

computing, for each of the multicast source and multicast flow identifiers, corresponding trace identifiers for generating a traceroute depicting interconnections of the network entities included in the multicast group wherein generating the corresponding trace identifier further comprises:

identifying, based on a lookup of the multicast source identifier and the multicast group identifier:

a service identifier, the service identifier dynamically generated for providing the multicast service on behalf of a requesting user wherein the service identifier occupies a MAC address field in a link trace management packet and the source and group are IP addresses; and a mnemonic name indicative of a SPB Network device; and building the trace identifier from the service identifier and the mnemonic name;

performing the generated traceroute using the generated trace identifiers;

rendering, based on device identifiers of the multicast group, a traceroute report of the network entities in the multicast group; and wherein a MAC DA is a multicast BMAC address including a 24-bit I-SID, and a 20-bit nickname.

5. The method of claim 4 wherein the corresponding trace identifiers include a corresponding VLAN and the MAC_DA that is used in the Ethernet header of the packets belonging to the multicast flow during transport in an SPB network, further comprising performing the generated traceroute using the VLAN and MAC DA.

6. The method of claim 4 wherein performing the traceroute sends trace messages from a signaling network entity for signaling an intermediate network entity to respond to the signaling network entity and forward the trace message to a successive network entity until the number of forwarding operations equals a time to live (TTL) field in the trace message.

7. The method of claim 6 further comprising:

defining the trace message based on a predetermined protocol, the trace message having a target address, the target address defining the device identifier of the network entity to which the trace is directed; and replacing the target address with the trace identifier indicating the multicast network target for which a trace is sought.

8. The method of claim 7 wherein the group is multicast group corresponding to a layer 3 multicast address; the trace message is received by a connectivity management application (CFM) according to IEEE 802.1ag for mapping the network identifier to the mnemonic name.

9. The method of claim 4 wherein the trace identifier follows a similar format as the device identifier employed in the unicast traceroute message; the trace identifier indicative of the multicast stream in lieu of a unicast device.

10. The method of claim 4 wherein the assigned network identifier corresponds to an IP address and the static device identifier corresponds to a MAC address.

11. The method of claim 10 wherein the service identifier corresponds to a multicast flow and a device identifier corresponds to the multicast source of the media stream carried by the multicast flow.

12. A network device conversant with network entities with assigned network identifiers and static device identifiers for rendering diagnostic information comprising:

an interface to a management console for receiving a multicast flow identifier, the multicast flow identifier corresponding to network identifiers of network entities included in a multicast group, and for:

receiving a multicast source identifier, the multicast source identifier indicative of a network identifier of a network entity from which a multicast transmission directed to the network entities in the multicast group emanates from;

a database for computing, for each of the multicast source and multicast flow identifiers, corresponding trace identifiers for generating a traceroute depicting interconnections of the network entities included in the multicast group;

performing the generated traceroute using the generated trace identifiers wherein the server is configured to query the database for generating the corresponding trace identifier by:

identifying, based on a lookup of the multicast source identifier and the multicast group identifier:

a VLAN, a service identifier, the service identifier dynamically generated for providing the multicast service on behalf of a requesting user wherein the service identifier occupies a MAC address field in a link trace management packet and the source and group are IP addresses;

a mnemonic name indicative of a SPB Network device; and building the trace identifier from the service identifier and the mnemonic name;

a display device for rendering, based on device identifiers of the multicast group, a traceroute report of the network entities in the multicast group; and wherein a MAC DA is a multicast BMAC address including a 24-bit I-SID, and a 20-bit nickname.

13. The network device of claim 12 further comprising a set of trace messages from a signaling network entity for signaling an intermediate network entity to respond to the signaling network entity and forward the trace message to a successive network entity until the number of forwarding operations equals a time to live (TTL) field in the trace message.

14. The network device of claim 13 wherein the network device is further configured to:

define the trace message based on a predetermined protocol, the trace message having a target address, the target address defining the device identifier of the network entity to which the trace is directed; and replace the target address with the trace identifier indicating the multicast network target for which a trace is sought.

15. The network device of claim 12 wherein the trace identifier follows a similar format as the device identifier employed in the unicast traceroute message; the trace identifier indicative of the multicast stream in lieu of a unicast device.

16. The network device of claim 15 wherein:

the assigned network identifier corresponds to an IP address;

the static device identifier corresponds to a MAC address;

the service identifier corresponds to a multicast flow; and a device identifier corresponds to the multicast source of the media stream carried by the multicast flow.

17. The network device of claim 12 wherein:

the trace message is a traceroute message according to IEEE 802.1ag;

the group is multicast group corresponding to a layer 3 multicast address; and the trace message is received by a connectivity management application (CFM) according to IEEE 802.1ag for mapping the network identifier to the mnemonic name.

* * * * *